United States Patent
Sahin et al.

(10) Patent No.: US 11,762,556 B2
(45) Date of Patent: *Sep. 19, 2023

(54) SYSTEM AND METHOD FOR ACCELERATED I/O ACCESS USING STORAGE ARRAY DRIVER IN OFF-THE-SHELF SERVER

(71) Applicant: EMC IP Holding Company, LLC, Hopkinton, MA (US)

(72) Inventors: Adnan Sahin, Needham, MA (US); Michael Scharland, Franklin, MA (US); Robert DeCrescenzo, Franklin, MA (US); Steven T. McClure, Northborough, MA (US); James Marriott Guyer, Northborough, MA (US); Jason J. Duquette, Milford, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/411,506

(22) Filed: Aug. 25, 2021

(65) Prior Publication Data
US 2021/0382629 A1 Dec. 9, 2021

Related U.S. Application Data

(63) Continuation of application No. 15/799,571, filed on Oct. 31, 2017, now Pat. No. 11,106,360.

(51) Int. Cl.
*G06F 3/00* (2006.01)
*G06F 3/06* (2006.01)

(52) U.S. Cl.
CPC .......... *G06F 3/0608* (2013.01); *G06F 3/0607* (2013.01); *G06F 3/0611* (2013.01); *G06F 3/0614* (2013.01); *G06F 3/0635* (2013.01); *G06F 3/0665* (2013.01); *G06F 3/0689* (2013.01)

(58) Field of Classification Search
CPC .... G06F 3/0608; G06F 3/0689; G06F 3/0611; G06F 3/0614; G06F 3/0635; G06F 3/0607; G06F 3/0665
See application file for complete search history.

(56) References Cited

U.S. PATENT DOCUMENTS

| 6,044,415 A | 3/2000 | Futral et al. |
|---|---|---|
| 2014/0089592 A1* | 3/2014 | Biswas ................ G06F 1/3275 711/E12.07 |

OTHER PUBLICATIONS

Non-Final Office Action issued in related U.S. Appl. No. 15/799,571 dated Jan. 24, 2019.

(Continued)

*Primary Examiner* — Craig S Goldschmidt
(74) *Attorney, Agent, or Firm* — Brian J. Colandreo; Heath M. Sargeant; Holland & Knight LLP

(57) ABSTRACT

A method, computer program product, and computer system for receiving, by a computing device, an I/O request. It may be identified whether the I/O request is eligible for handling via a first path without also requiring handling via a second path. If the I/O request is eligible, the I/O request may be processed via the first path on a host I/O stack without processing the I/O request via the second path on a storage array I/O stack. If the I/O request is ineligible, the I/O request may be processed via the first path on the host.

14 Claims, 9 Drawing Sheets

(56) References Cited

OTHER PUBLICATIONS

Final Office Action issued in related U.S. Appl. No. 15/799,571 dated Aug. 8, 2019.
Non-Final Office Action issued in related U.S. Appl. No. 15/799,571 dated Feb. 21, 2020.
Final Office Action issued in related U.S. Appl. No. 15/799,571 dated Sep. 2, 2020.
Notice of Allowance issued in related U.S. Appl. No. 15/799,571 dated May 7, 2021.

* cited by examiner

SYSTEM AND METHOD FOR ACCELERATED I/O ACCESS USING STORAGE ARRAY DRIVER IN OFF-THE-SHELF SERVER

CROSS-REFERENCE TO RELATED APPLICATIONS

The subject application is a continuation of U.S. application Ser. No. 15/799,571; filed Oct. 31, 2017. The entire disclosure of which is herein incorporated by reference.

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, by a computing device, an I/O request. It may be identified whether the I/O request is eligible for handling via a first path without also requiring handling via a second path. If the I/O request is eligible, the I/O request may be processed via the first path on a host I/O stack without processing the I/O request via the second path on a storage array I/O stack. If the I/O request is ineligible, the I/O request may be processed via the first path on the host I/O stack and via the second path on the storage array I/O stack.

One or more of the following example features may be included. An eligible I/O request may include one of a data read request and a data write request. An ineligible I/O request may include at least one of a control command and an I/O request satisfying a predetermined condition. Processing the I/O request via the first path on the host I/O stack without processing the I/O request via the second path on the storage array I/O stack may include processing an optimistic query. Processing the I/O request via the first path on the host I/O stack without processing the I/O request via the second path on the storage array I/O stack may include generating a metadata query based upon, at least in part, the I/O request. The I/O request may be processed via the first path on the host I/O stack and via the second path on the storage array I/O stack when processing of the I/O request via the host I/O stack on the first path without processing the I/O request via the second path on the storage array I/O stack fails. A completion status may be returned to an application layer of the host I/O stack when processing of the I/O request via the host I/O stack on the first path without processing the I/O request via the second path on the storage array I/O stack successfully completes.

In another example implementation, a computing system may include one or more processors and one or more memories configured to perform operations that may include but are not limited to receiving an I/O request. It may be identified whether the I/O request is eligible for handling via a first path without also requiring handling via a second path. If the I/O request is eligible, the I/O request may be processed via the first path on a host I/O stack without processing the I/O request via the second path on a storage array I/O stack. If the I/O request is ineligible, the I/O request may be processed via the first path on the host I/O stack and via the second path on the storage array I/O stack.

One or more of the following example features may be included. An eligible I/O request may include one of a data read request and a data write request. An ineligible I/O request may include at least one of a control command and an I/O request satisfying a predetermined condition. Processing the I/O request via the first path on the host I/O stack without processing the I/O request via the second path on the storage array I/O stack may include processing an optimistic query. Processing the I/O request via the first path on the host I/O stack without processing the I/O request via the second path on the storage array I/O stack may include generating a metadata query based upon, at least in part, the I/O request. The I/O request may be processed via the first path on the host I/O stack and via the second path on the storage array I/O stack when processing of the I/O request via the host I/O stack on the first path without processing the I/O request via the second path on the storage array I/O stack fails. A completion status may be returned to an application layer of the host I/O stack when processing of the I/O request via the host I/O stack on the first path without processing the I/O request via the second path on the storage array I/O stack successfully completes.

In another example implementation, a computer program product may reside on a computer readable storage medium having a plurality of instructions stored thereon which, when executed across one or more processors, may cause at least a portion of the one or more processors to perform operations that may include but are not limited to receiving an I/O request. It may be identified whether the I/O request is eligible for handling via a first path without also requiring handling via a second path. If the I/O request is eligible, the I/O request may be processed via the first path on a host I/O stack without processing the I/O request via the second path on a storage array I/O stack. If the I/O request is ineligible, the I/O request may be processed via the first path on the host I/O stack and via the second path on the storage array I/O stack.

One or more of the following example features may be included. An eligible I/O request may include one of a data read request and a data write request. An ineligible I/O request may include at least one of a control command and an I/O request satisfying a predetermined condition. Processing the I/O request via the first path on the host I/O stack without processing the I/O request via the second path on the storage array I/O stack may include processing an optimistic query. Processing the I/O request via the first path on the host I/O stack without processing the I/O request via the second path on the storage array I/O stack may include generating a metadata query based upon, at least in part, the I/O request. The I/O request may be processed via the first path on the host I/O stack and via the second path on the storage array I/O stack when processing of the I/O request via the host I/O stack on the first path without processing the I/O request via the second path on the storage array I/O stack fails. A completion status may be returned to an application layer of the host I/O stack when processing of the I/O request via the host I/O stack on the first path without processing the I/O request via the second path on the storage array I/O stack successfully completes.

The details of one or more example implementations are set forth in the accompanying drawings and the description below. Other possible example features and/or possible example advantages will become apparent from the description, the drawings, and the claims. Some implementations may not have those possible example features and/or pos-

BRIEF DESCRIPTION OF THE DRAWINGS

Like reference symbols in the various drawings indicate like elements.

DETAILED DESCRIPTION

System Overview

Figure 1:
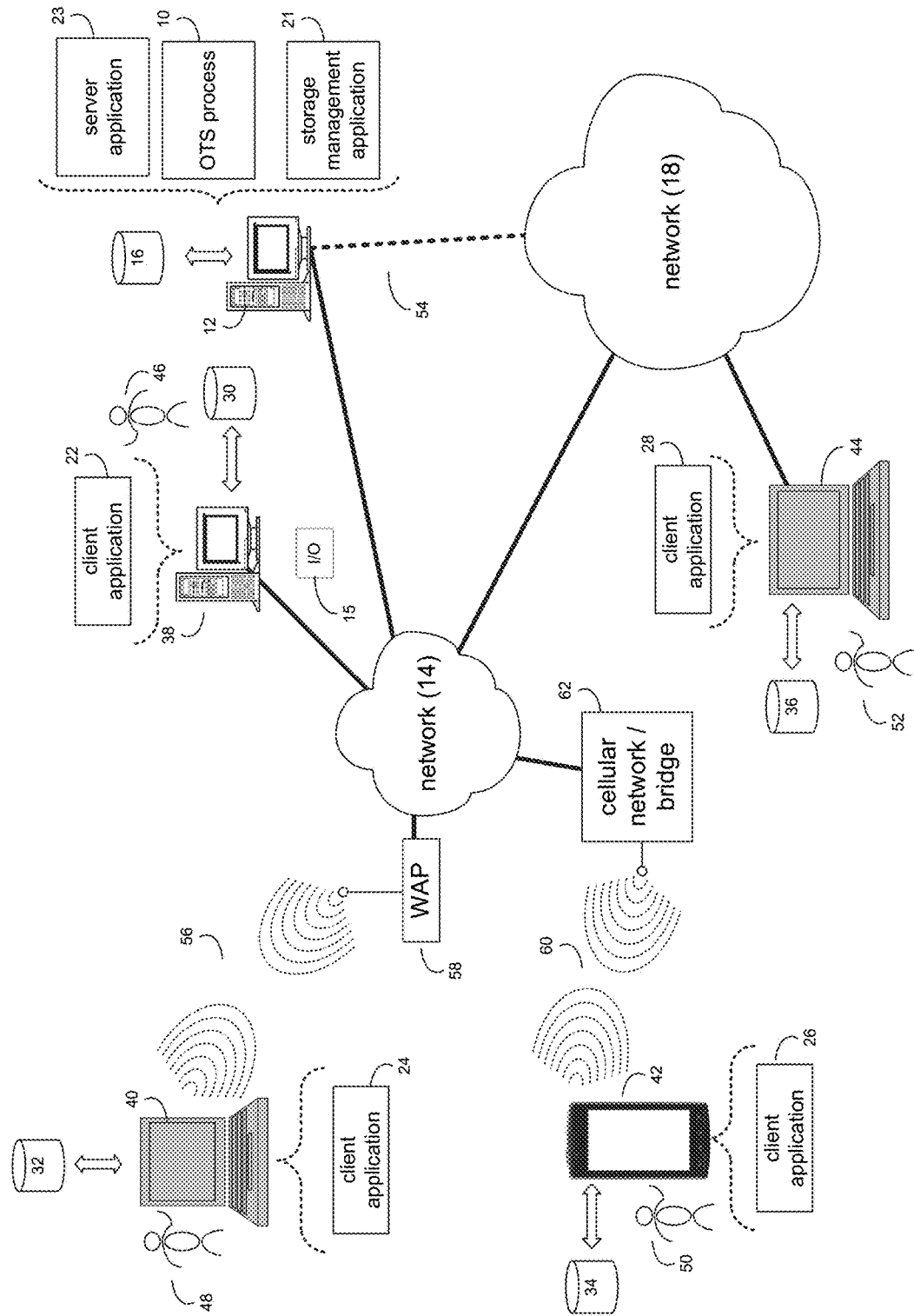
FIG. 1 is an example diagrammatic view of an Off-the-shelf (OTS) process coupled to an example distributed computing network according to one or more example implementations of the disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown off-the-shelf (OTS) process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a OTS process, such as OTS process 10 of FIG. 1, may receive, by a computing device, an I/O request (e.g., I/O 15). It may be identified whether the I/O request is eligible for handling via a first path without also requiring handling via a second path. If the I/O request is eligible, the I/O request may be processed via the first path on a host I/O stack without processing the I/O request via the second path on a storage array I/O stack. If the I/O request is ineligible, the I/O request may be processed via the first path on the host I/O stack and via the second path on the storage array I/O stack.

In some implementations, the instruction sets and subroutines of OTS process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, OTS process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage™ from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, OTS process 10 and/or storage management application 21 may be accessed via one or more of client applications 22, 24, 26, 28. In some implementations, OTS process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within OTS process 10, a component of OTS process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of OTS process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of OTS process 10 (and vice versa). Accordingly, in some implementations, OTS process 10 may be a purely server-side application, a purely client-side application, or a hybrid server-side/client-side application that is cooperatively executed by one or more of client applications 22, 24, 26, 28 and/or OTS process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, OTS process 10, and storage management application 21, taken singly or in any combination, may effectuate some or all of the same functionality, any description of effectuating such functionality via one or more of client applications 22, 24, 26, 28, OTS process 10, storage management application 21, or combination thereof, and any described interaction(s) between one or more of client applications 22, 24, 26, 28, OTS process 10, storage management application 21, or combination thereof to effectuate such functionality, should be taken as an example only and not to limit the scope of the disclosure.

In some implementations, one or more of users 46, 48, 50, 52 may access computer 12 and OTS process 10 (e.g., using one or more of client electronic devices 38, 40, 42, 44) directly through network 14 or through secondary network 18. Further, computer 12 may be connected to network 14 through secondary network 18, as illustrated with phantom link line 54. OTS process 10 may include one or more user interfaces, such as browsers and textual or graphical user interfaces, through which users 46, 48, 50, 52 may access OTS process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Data Storage System

Figure 2:
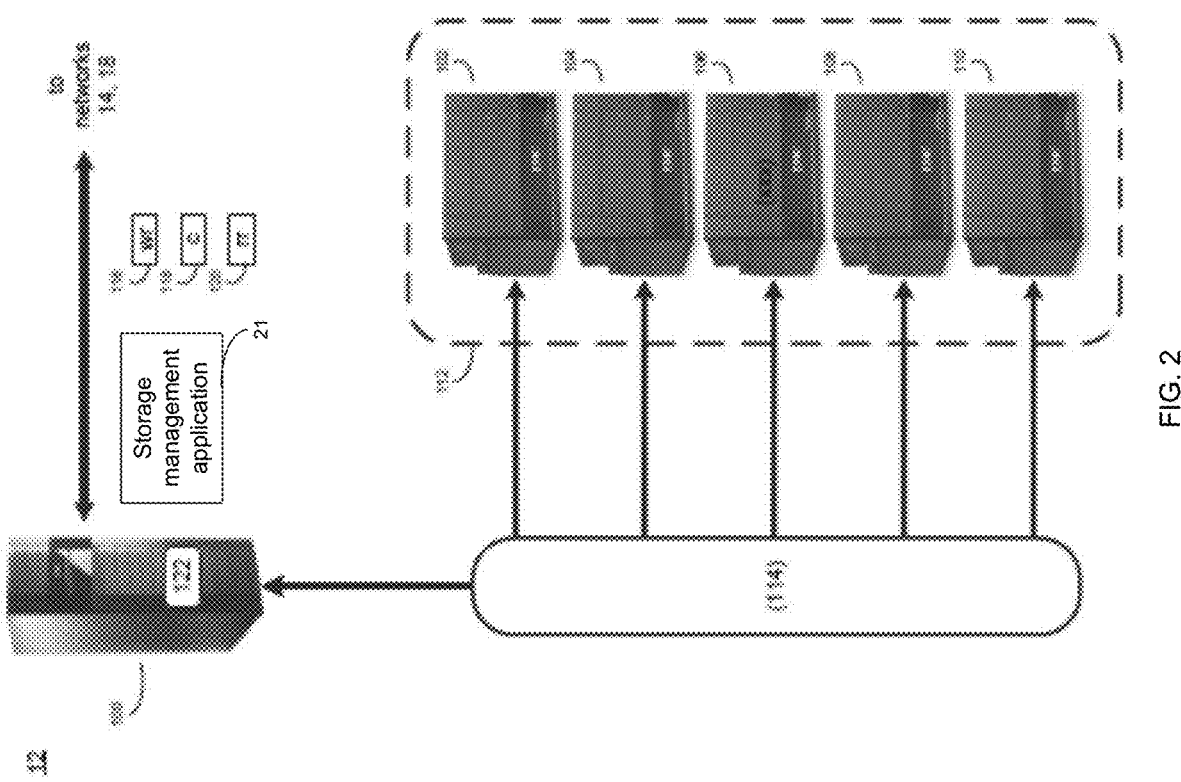
FIG. 2 is an example diagrammatic view of a computer of FIG. 1 according to one or more example implementations of the disclosure.
Figure 3:
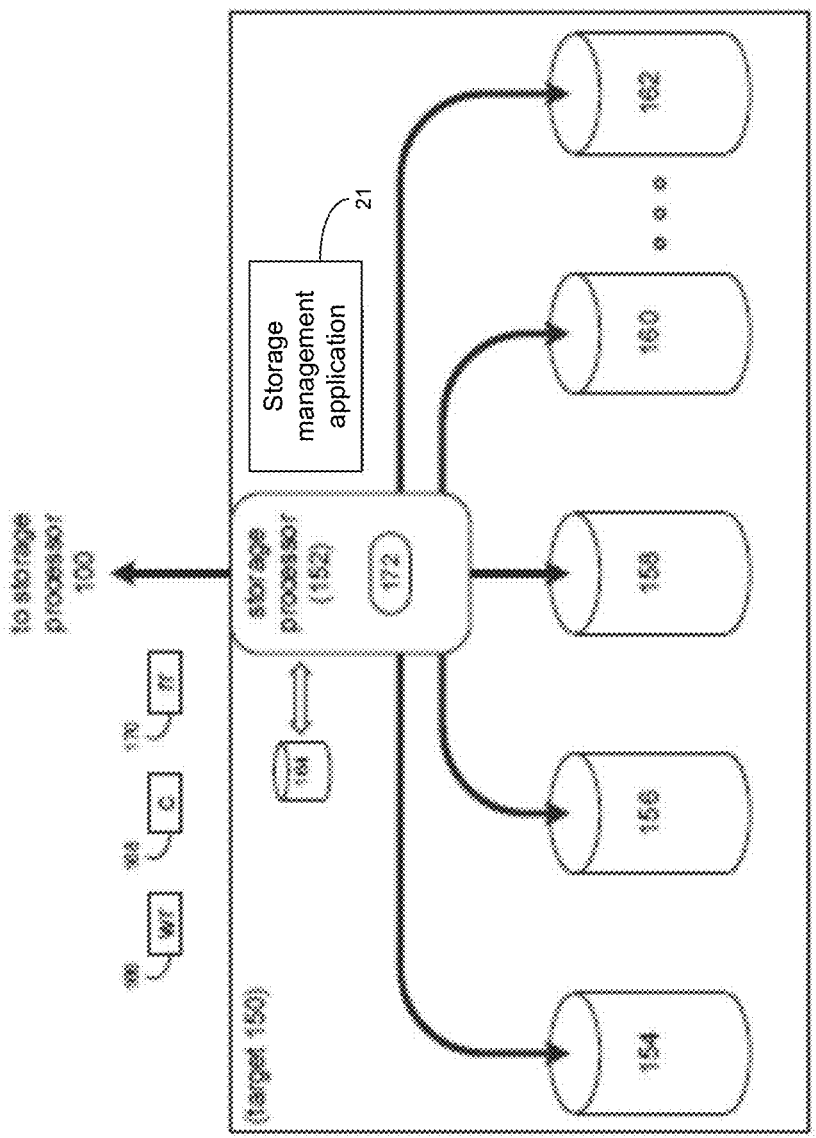
FIG. 3 is an example diagrammatic view of a storage target of FIG. 1 according to one or more example implementations of the disclosure.

Referring also to the example implementation of FIGS. 2-3 (e.g., where computer 12 may be configured as a data storage system), computer 12 may include storage processor 100 (which may instead be a general purpose processor) and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively, I/O requests may be generated by computer 12, where the generated I/Os may be due to processing requests from, e.g., client applications 22, 24, 26, 28. Additionally/alternatively (e.g., when storage processor 100 is configured as an application server or otherwise), these I/O requests may be internally generated within storage processor 100 (e.g., via a server application, such as server application 23). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via server application 23).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or OTS process 10) may be executed by one or more processors and one or more memory architectures included with data array 112.

In some implementations, storage processor 100 may include front end cache memory system 122 (e.g., host-based cache memory). Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system (e.g., array-based cache memory) may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
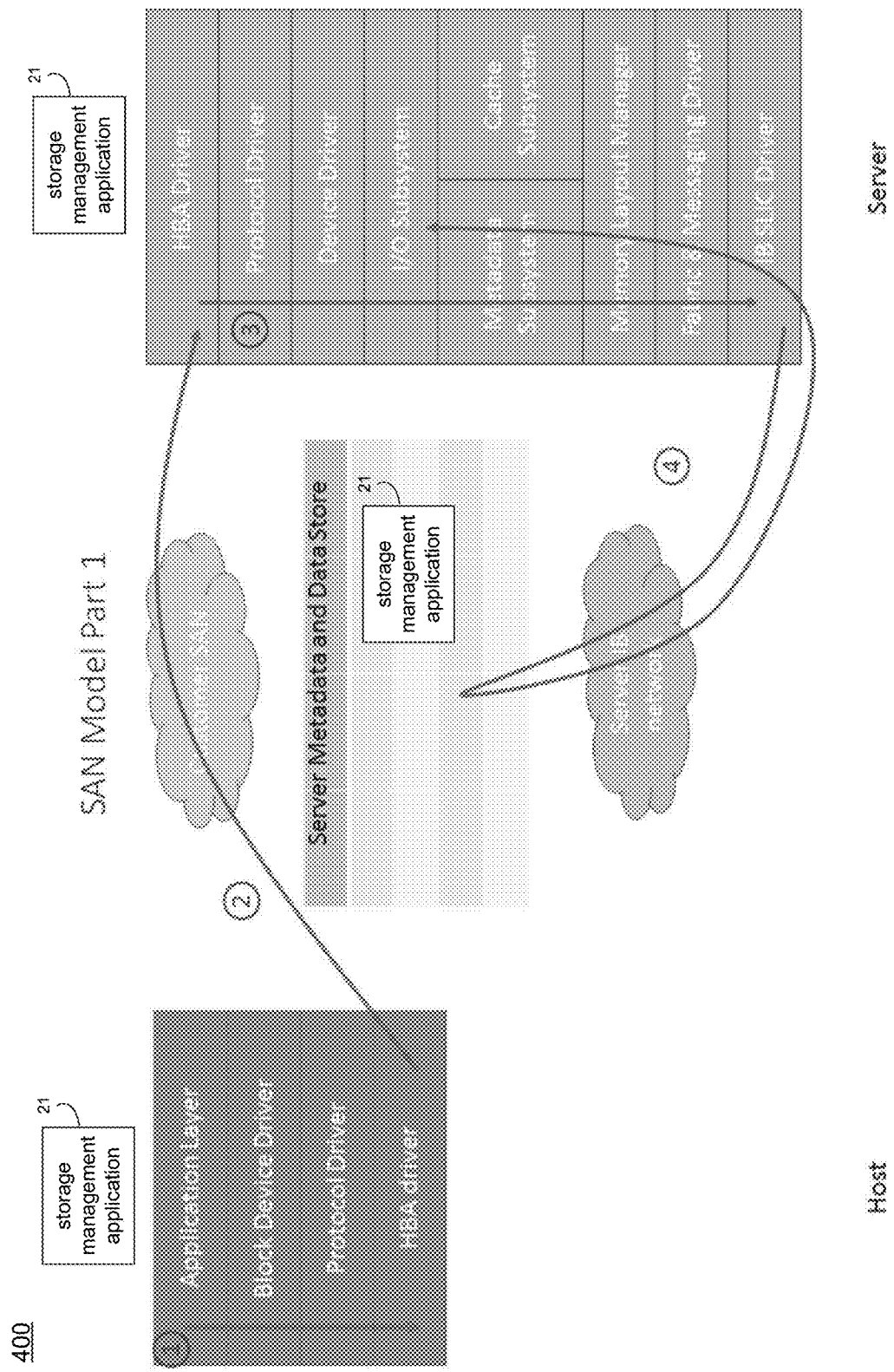
FIG. 4 is an example diagrammatic view of an example SAN Model according to one or more example implementations of the disclosure.
Figure 5:
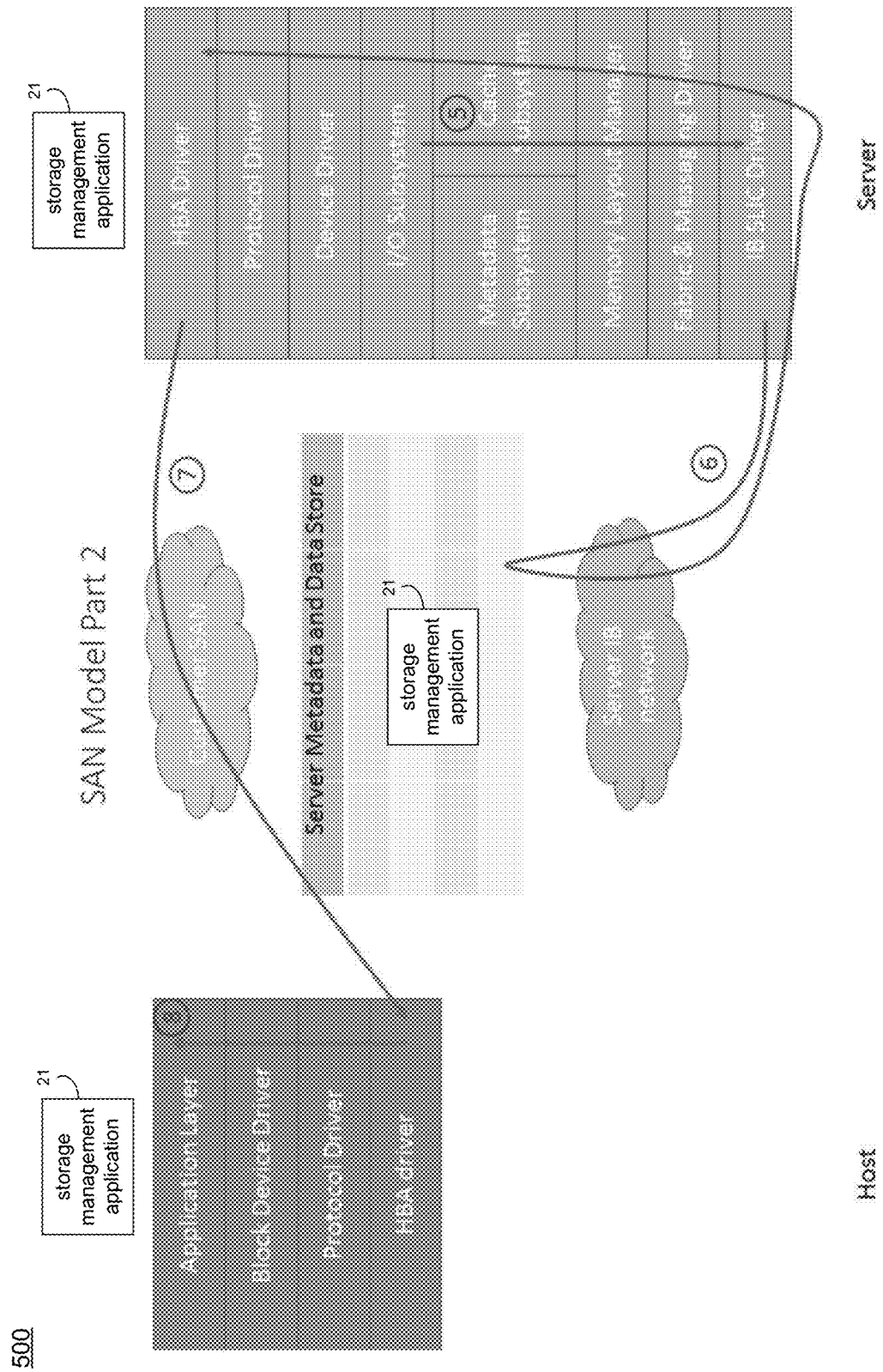
FIG. 5 is an example diagrammatic view of an example SAN Model according to one or more example implementations of the disclosure.
Figure 6:
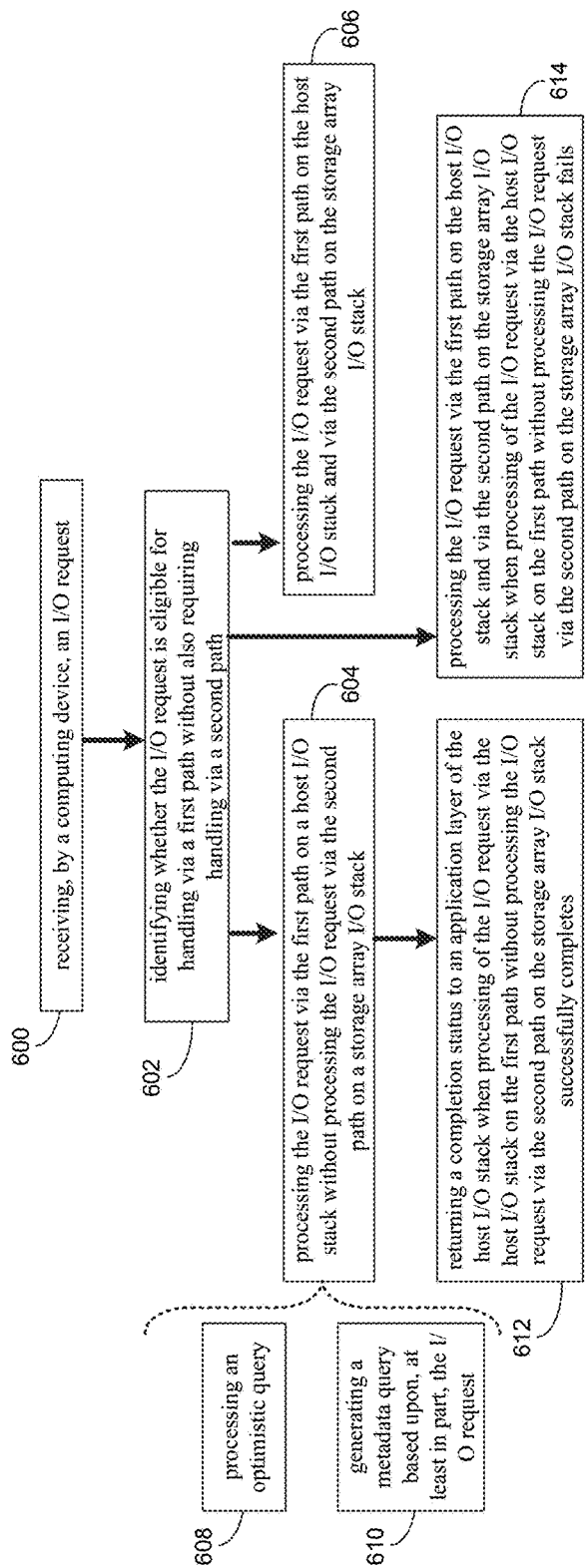
FIG. 6 is an example flowchart of a OTS process according to one or more example implementations of the disclosure.

Generally, a SAN Model may exist for a read I/O satisfied from a storage system data cache, such as but not limited to the VMAX™ data cache offered from Dell EMC™. For instance, and referring to the SAN Model Part 1 in FIG. 4 and the SAN Model part 2 in FIG. 5, storage management application 21 may receive an I/O in the application layer (1) on a host server, which may be funneled down through the block driver, protocol driver (e.g., SCSI) and HBA driver (e.g., Fibre channel) to allow the read request to be sent via the SAN to a VMAX™ front end director (2). Generally, the left side of FIG. 4 may be the host or server (e.g., computer 12). The right side may be the storage array software stack. The table in the middle may represent data and metadata structures stored within the storage array, which generally do not live in the server software stack. The I/O may be recognized on the VMAX™ side by the HBA driver (3) and may then be routed through a few layers including a protocol driver, VMAX™ device driver, and into the I/O subsystem. At this point, the I/O subsystem (e.g., via storage management application 21) may perform a metadata subsystem query (4) (e.g., "Is this data in cache?"). Metadata may be distributed on more than one server. This metadata subsystem query may result in a remote memory request on the server IB network to one of the other servers to access the metadata content. After the server IB network internal request completes and the results are returned to the I/O subsystem, another request may be made of the cache subsystem to return the requested data (5). Cache data may also be distributed on more than one server. This cache subsystem request may result in a remote memory read request on the server IB network to acquire the requested data and place it in memory that the HBA driver may then return to the host via a transfer over the SAN (6 and 7). Once the data has been received by the HBA driver and the I/O has a successful logical completion received from the VMAX™ side, the data may then be returned to the application layer (8).

While the above system may be beneficial for some implementations, for other implementations, it may be more beneficial and/or cheaper to use "off-the-shelf" or "general purpose" server CPUs for serving IOs into and out of local storage devices. However, generally, software-defined storage systems and hyper-converged infrastructure systems that may use off-the-shelf server CPUs for serving IOs into and out of local storage devices may have to re-implement all the data services at their level. Typically, users cannot leverage trusted data services from storage arrays in such SDS/HCI environments. To be clear, the above system may also use off-the-shelf servers, but they generally do not have a VMAX™-aware software component running in the off-shelf-server (e.g., computer 12).

Thus, as will be discussed below, off-the-shelf (OTS) process 10 may enable the taking of traditional storage array functionality, and moving part or whole I/O processing into an off-the-shelf server CPU, while maintaining the storage array data services. In some implementations, this may be accomplished by having a VMAX™-aware software running in computer 12, allowing it to be part of internal fabric 114. As will be discussed below, OTS process 10 may at least help, e.g., the improvement of an existing storage technology, necessarily rooted in computer technology in order to overcome an example and non-limiting problem specifically arising in the realm of data storage. For instance, OTS process 10 may use an efficient process to take traditional storage array functionality and move part or whole I/O processing into an off-the-shelf server CPU, while maintaining the storage array data services.

The OTS Process

As discussed above and referring also at least to the example implementations of FIGS. 6-9, OTS process 10 may receive 600, by a computing device, an I/O request. OTS process 10 may identify 602 whether the I/O request is eligible for handling via a first path without also requiring handling via a second path. If the I/O request is eligible, OTS process 10 may process 604 the I/O request via the first path on a host I/O stack without processing the I/O request via the second path on a storage array I/O stack. If the I/O request is ineligible, OTS process 10 may 606 the I/O request via the first path on the host I/O stack and via the second path on the storage array I/O stack.

Figure 7:
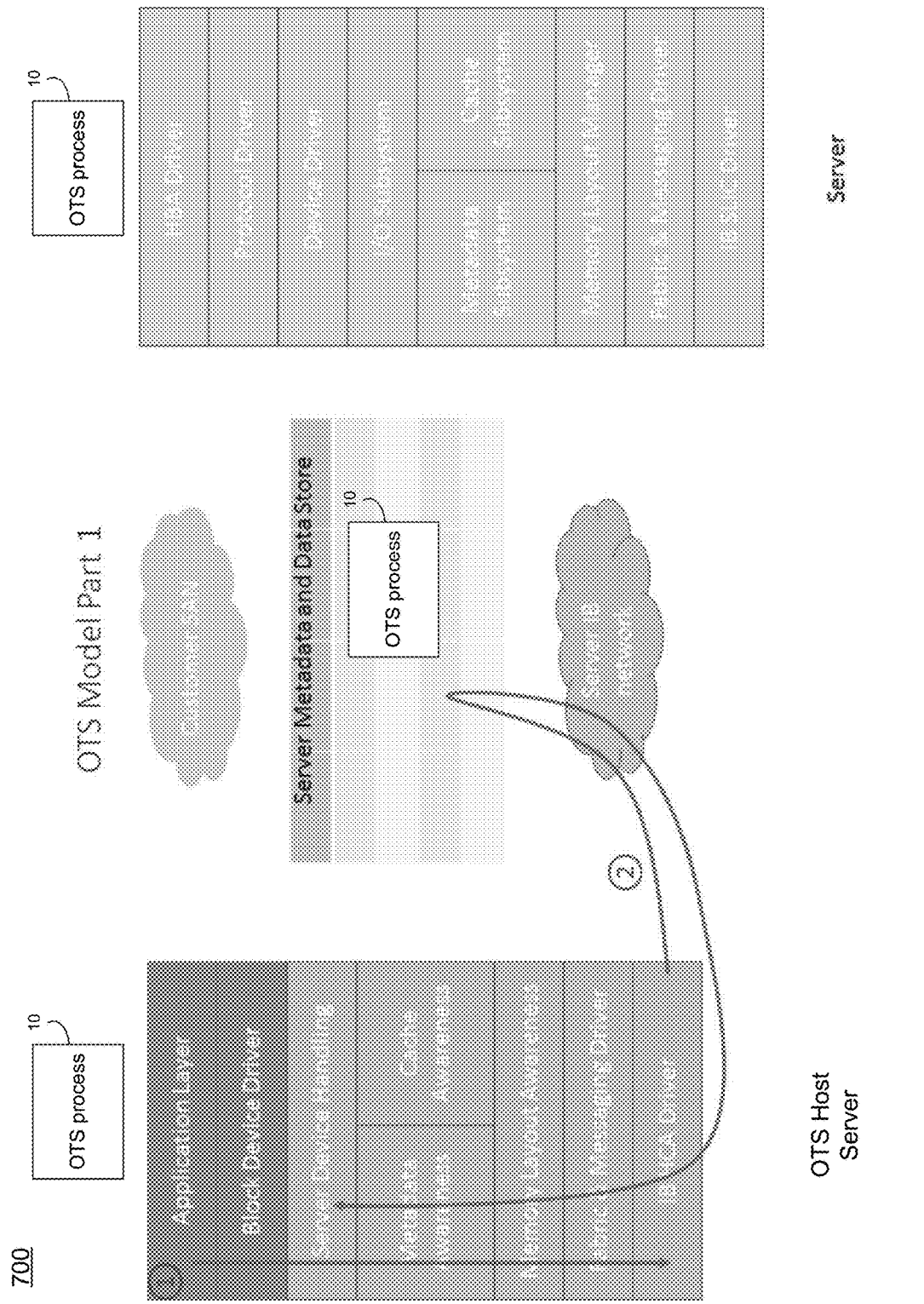
FIG. 7 is an example diagrammatic view of an example off-the-shelf model according to one or more example implementations of the disclosure.
Figure 8:
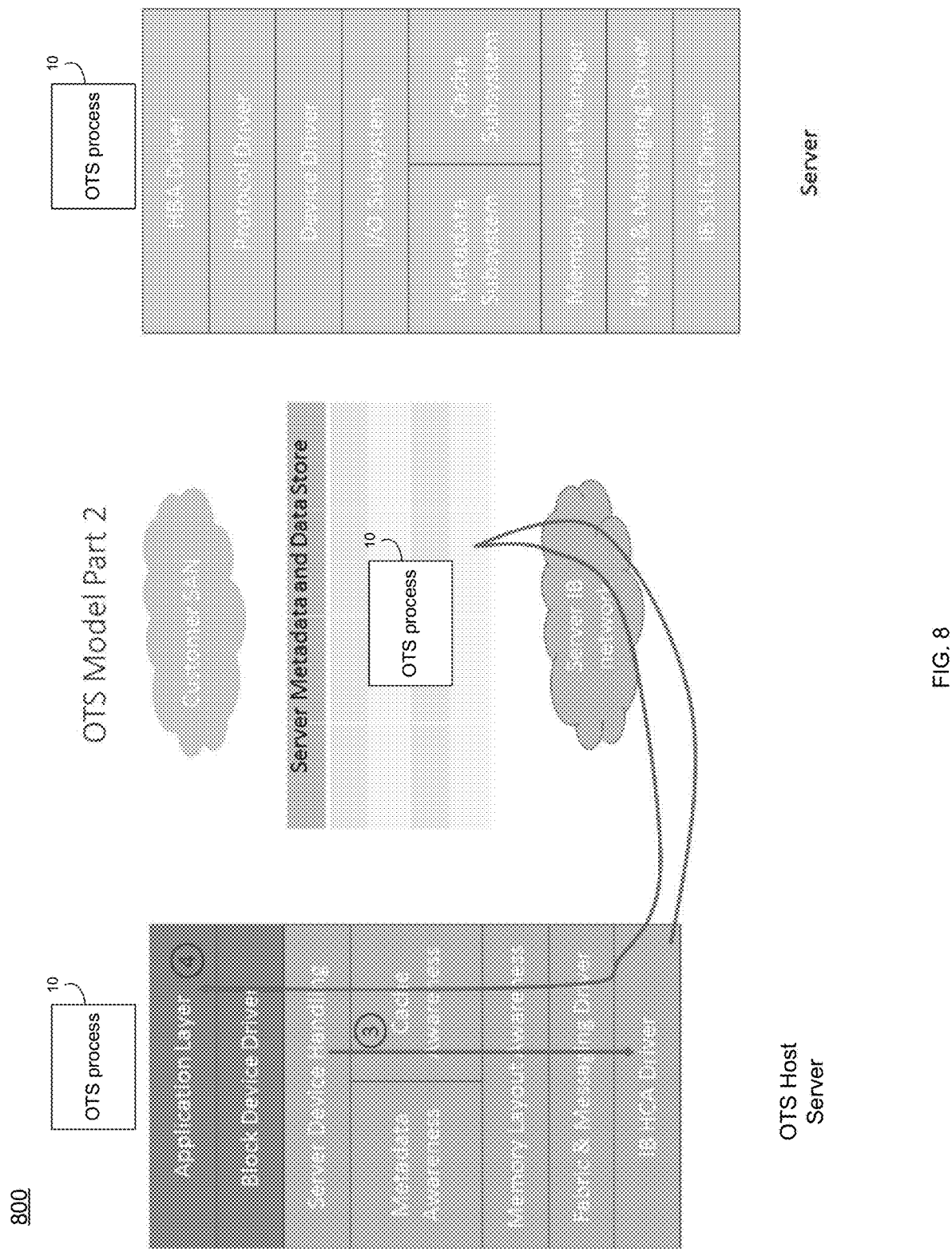
FIG. 8 is an example diagrammatic view of an example off-the-shelf model according to one or more example implementations of the disclosure.

In some implementations, OTS process 10 may receive 600, by a computing device, an I/O request. For instance, and referring at least to the example implementation of FIGS. 7-8, an example, off-the-shelf (OTS) model (part 1) 700 and 800 (part 2) is shown. In the example, assume for example purposes only that a user (e.g., user 46) would like to access data stored on the server metadata and data store. Such an I/O request (e.g., I/O 15) may be generated (e.g., via client computing device 38) and received 600 by OTS process 10. In some implementations, client application 22 and user 46 may also be resident on computer 12, thus, the I/O request may also be generated by computer 12 (via OTS process 10). In FIGS. 7 and 8, the left side may be the host or server (e.g., computer 12). The right hand side may be the storage array software stack. The table in the middle may represent data and metadata structures stored within the storage array, and generally do not live in the server software stack.

In some implementations, OTS process 10 may identify 602 whether the I/O request is eligible for handling via a first path without also requiring handling via a second path. For instance, in some implementations, I/O 15 may be initiated (received) at the application layer and passed through the block device driver of the host I/O stack (of the OTS host server) to a point where I/O 15 may be identified 602 (e.g., recognized) as either being eligible for "fast path handling" (e.g., handling via a first path, such as example steps (1)-(4) in FIGS. 7-8, without also requiring handling via a second path, such steps (3)-(7) in FIGS. 4-5). That is, the need to involve the second path on a storage array I/O stack of the storage array server may be completely obviated, thereby enabling use of off-the-shelf or general purpose servers. Thus, in some implementations, if the I/O request is eligible, OTS process 10 may process 604 the I/O request via the first path on a host I/O stack without processing the I/O request via the second path on a storage array I/O stack, and if the I/O request is ineligible, OTS process 10 may 606 the I/O request via the first path on the host I/O stack and via the second path on the storage array I/O stack.

In some implementations, the "fast path handling" shows how OTS process 10 may process a host read command that is satisfied out of the storage array cache. For instance, a quick metadata access by OTS process 10 may help identify that the requested data is present in the storage array cache and identify its location, where OTS process 10 may then fetch the data from the storage array cache and place it into the host memory, providing the application layer with the requested data.

In some implementations, an eligible I/O request may include one of a data read request and a data write request, and an ineligible I/O request may include at least one of a control command and an I/O request satisfying a predetermined condition. For instance, in some implementations, only data read and write requests may be identified 602 as being eligible for fast path handling. Generally, control commands may be identified 602 as ineligible for fast path handling, and thus potentially requiring "slow path handling," such as the example shown in FIGS. 4-5. In some implementations, the Server Device Handling layer in the host I/O stack may have awareness (e.g., through coordination with the storage array) of whether there are any "special conditions" that may prevent fast path handling. For instance, if there is some complicated state that requires intimate, instantaneous knowledge of what is happening in the storage array, rather than trying to keep the host I/O stack fully up to date with all of the necessary information, OTS process 10 may determine it is easier for the host layer to pass the command on to the storage array for normal/legacy handling (i.e., "slow path handling").

In some implementations, the I/O request may be routed (e.g., called from one layer into another layer) through abbreviated versions of device and metadata subsystem handling by OTS process 10. For instance, there may be different layers of software functionality residing in the host I/O stack. In some implementations, the host I/O stack changes may provide quick responses to I/O requests that cover the majority of cases and states. Thus, there may not be a need for the device and metadata subsystem layers in the host I/O stack to deal with complicated scenarios or system states. In some implementations, if OTS process 10 identifies the presence of such a complicated state/scenario, or that some subtle handling may be needed, OTS process 10 may avoid using the "fast path handling" and may instead send I/O 15 to the storage array for "normal" handling (e.g., "slow path handling"). Thus, an example benefit to be had in I/O response time may come from not loading the host I/O stack with lots of complicated state handling, therefore enabling OTS process 10 to make a quick go/no-go decision on the "fast path handling" viability, and either proceed that way or offload the I/O to the slow path handling route.

In some implementations, processing 604 the I/O request via the first path on the host I/O stack without processing the I/O request via the second path on the storage array I/O stack may include processing 608 an optimistic query. For instance, the components in the host I/O stack may not be sufficient to participate in "full management" of the metadata subsystem (for example) like the storage system server; however, those components may have enough knowledge of that subsystem to satisfy optimistic queries for "simple" (e.g., eligible) state handling. As noted above, anything too "complicated" (e.g., ineligible) may result in OTS process 10 passing I/O 15 to be processed 606 via the storage array. An example of less than "full management" of the metadata subsystem may include, e.g., read-only access to metadata content.

Again, in the interest of being lightweight and fast, full metadata subsystem access (including write/edit) capabilities may require heavy (i.e. costly) operations, such as array-level serialization semantics. If there are actions that the fast path logic of OTS process 10 may undertake without needing to honor these semantics, while also having the ability to detect inconsistencies and silently retry if very small race conditions are hit, such actions may be attempted. For example, OTS process 10 may assume that the abbreviated metadata subsystem has a "good/optimistic" idea (but, not necessarily perfect or up-to-date knowledge) of where to locate the metadata needed for I/O 15, and if this good (but, not perfect) view of things is incorrect, OTS process 10 may have sufficient redundancy to recognize that fact and silently retry should something have changed right around the time of the optimistic query.

Generally, having "enough knowledge" may refer to the "good, but not necessarily perfect," view of the system. As an example, assume that inside the storage array, any time it is desired to move (e.g., page out, relocate, etc.) a piece of metadata, OTS process 10 may require notification and positive acknowledgement from all of the processors inside the storage array. However, in the example host I/O stack model, OTS process 10 has a mechanism to learn this information lazily and the picture of the system may be substantially correct (e.g., 99% correct, but likely not 100% correct).

Figure 9:
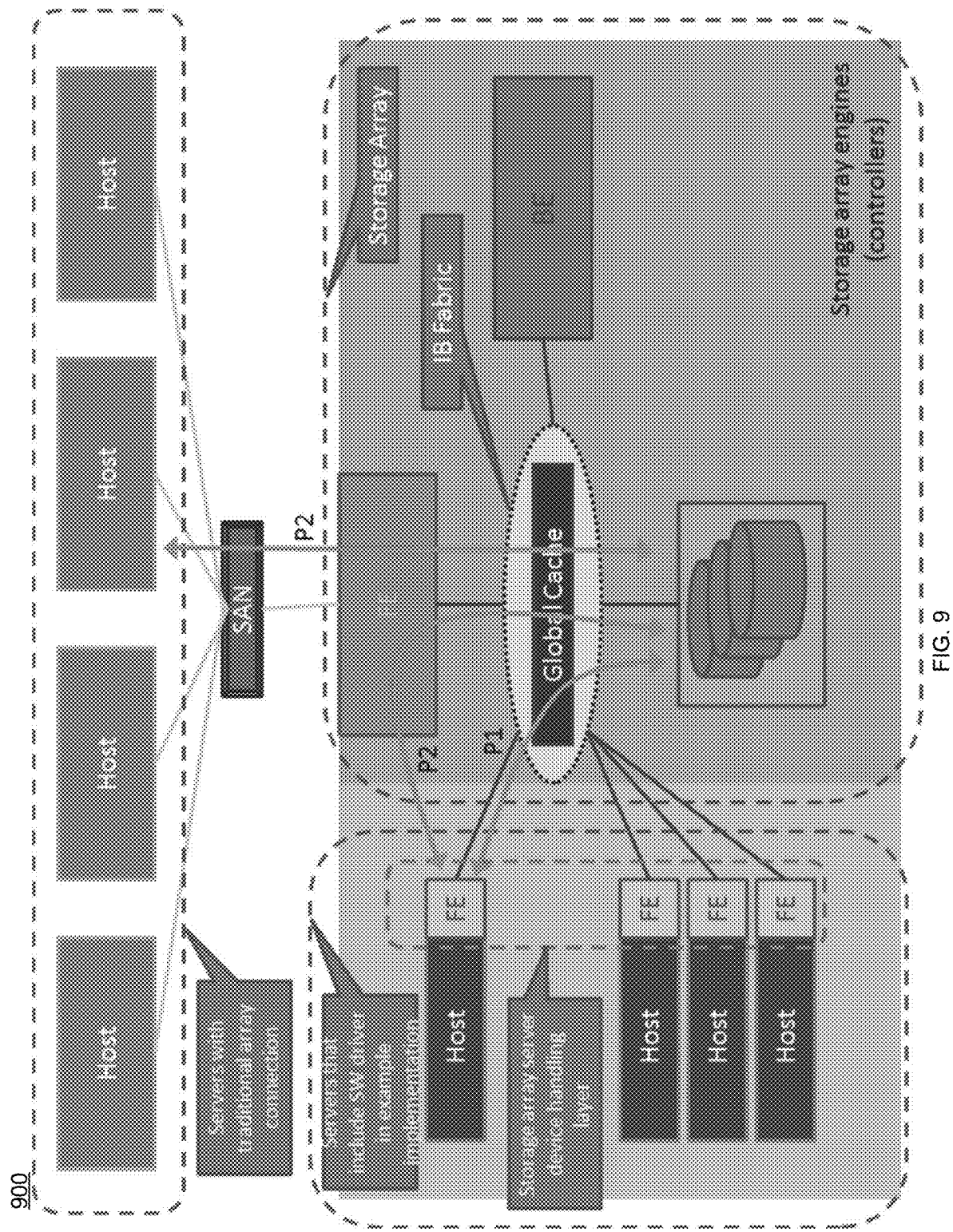
FIG. 9 is an example diagrammatic view of an example storage system layout according to one or more example implementations of the disclosure.

In some implementations, and referring at least to the example implementation of FIG. 9, an example storage system layout 900 with the storage array Server Device Handling Layer is shown in more detail. The Server Device Handling Layer (or the driver) brings storage array awareness to the server stack. In some implementations, processing 604 the I/O request via the first path (e.g., where P1 is the first path and P2 is the second path in FIG. 9) on the host I/O stack without processing the I/O request via the second path on the storage array I/O stack may include generating 610 a metadata query based upon, at least in part, the I/O request. For instance, the metadata query (shown via step (2)) may result in an internal fabric request and the result of the query may be called back to the device handler layer. For example, the generated 610 metadata query may be built out of the storage array Server Device Handling Layer of the host I/O stack. I/O 15 may be requesting data from a particular range of the logical storage device that is presented to the application layer, and the metadata query may be requesting the location/cache status of that data within the storage array (e.g., "is this data in the array cache, and if so, what cache address is it stored in?"), where the result may include, e.g., a no/yes+address answer.

In some implementations, after realizing that the desired data is in the cache, OTS process 10 (e.g., via the storage array Server Device Handling Layer) may generate a request called through an abbreviated cache-awareness layer (similar to the metadata-aware layer, this component may satisfy optimistic queries but generally cannot participate in full cache management operations such as, e.g., allocation, recycling, LRU updates, etc.) that may generate another fabric request to read the requested data from the cache, as shown in step (3). In some implementations, the request may include enough information to describe how to transfer data from the storage array cache into the host memory, and may include such information as, for example, source and destination fabric addresses, information about how to ensure the self-consistency of the data (e.g., if the data has an expected checksum, and if so what is that value, etc.). The fabric request may include, e.g., source and destination fabric addresses, self-consistency validation, etc.) and may be sent (via OTS process 10) to the fabric and messaging driver of the host I/O stack so that the fabric request may be turned into a physical request to read and validate some memory that resides in the storage array (e.g., the Server Metadata and Data Store).

In some implementations, OTS process 10 may return 612 a completion status to an application layer of the host I/O stack when processing 604 of the I/O request via the host I/O stack on the first path without processing the I/O request via the second path on the storage array I/O stack successfully completes. For instance, upon the completion of the fabric operation, OTS process 10 may return 612 a completion status all the way up to the application layer, as shown in step (4).

In some implementations, the I/O request may be processed 614 via the first path on the host I/O stack and via the second path on the storage array I/O stack when processing 604 of the I/O request via the host I/O stack on the first path without processing the I/O request via the second path on the storage array I/O stack fails. For instance, should there be any sort of I/O failure in the fast path processing 604 (e.g., processing 604 of the I/O request via the host I/O stack on the first path without processing the I/O request via the second path on the storage array I/O stack) OTS process 10 may retry the processing of I/O 15 by, e.g., using the slow path (e.g., processing 606 via the first path on the host I/O stack and via the second path on the storage array I/O stack).

Thus, in some implementations, OTS process 10 may bring awareness of the storage array internal semantics into the host I/O stack server as a "driver" (e.g., the Server Device Handling Layer), e.g., in the operating system. OTS process 10 may not have the full frontend functionality within the storage array; however, OTS process 10 may encapsulate most of the I/O processing capabilities, such as where data resides in the data persistence layers (e.g., in global memory or in storage media). In some implementations, OTS process 10 may enable off-the-shelf computer elements to reside directly on the array backplane/fabric. This may enable low latency and high bandwidth access to the data. In some implementations, OTS process 10 may include enablement to cache the data (read only or read/write) locally on the persistent media in servers (e.g., computer 12). This may extend array level cache coherence and clustering capabilities to the servers, and may help bring array based data closer to processing units (e.g., CPU/GPU/TPU) in the servers for applications that may require high performance/low latency operations, such as machine learning, artificial intelligence, OLTP and DSS/DWH RDMBs, no-sql DB s, etc.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, by a computing device, an I/O request;
   identifying a first path for processing I/O requests, wherein the first path includes processing by a general purpose processor;
   identifying a second path for processing I/O requests, wherein the second path includes processing by a special purpose storage processor;
   determining that the I/O request is ineligible for handling via a first path without also requiring handling via a second path;
   in response to determining that the I/O request is ineligible, processing the I/O request via the first path on a host I/O stack and via the second path on a storage array I/O stack, wherein an ineligible I/O request includes a control command and satisfies a predetermined condition, wherein satisfying the predetermined condition includes a Server Device Handling layer in the host I/O stack determining, in coordination with the storage array I/O stack, that the control command should be passed to the storage array I/O stack via the second path;
   wherein any I/O requests that are determined to be eligible are processed via the first path on the host I/O stack without processing the eligible I/O request via the second path on the storage array I/O stack.

2. The computer-implemented method of claim 1 wherein an eligible I/O request includes one of a data read request and a data write request.

3. The computer-implemented method of claim 1 further comprising processing the I/O request via the first path on the host I/O stack and via the second path on the storage array I/O stack when processing of the I/O request via the host I/O stack on the first path without processing the I/O request via the second path on the storage array I/O stack fails.

4. The computer-implemented method of claim 1 further comprising returning a completion status to an application layer of the host I/O stack when processing of the I/O request via the host I/O stack on the first path without processing the I/O request via the second path on the storage array I/O stack successfully completes.

5. The computer-implemented method of claim 1 wherein the internal fabric request resulting from the metadata query includes requesting at least one of a location status and a cache status of metadata within the storage array I/O stack.

6. A computer program product residing on a non-transitory computer readable storage medium having a plurality of instructions stored thereon which, when executed across one or more processors, causes at least a portion of the one or more processors to perform operations comprising:
   receiving an I/O request;
   identifying a first path for processing I/O requests, wherein the first path includes processing by a general purpose processor;
   identifying a second path for processing I/O requests, wherein the second path includes processing by a special purpose storage processor;
   identifying whether the I/O request is eligible for handling via a first path without also requiring handling via a second path;
   if the I/O request is eligible, processing the I/O request via the first path on a host I/O stack without processing the I/O request via the second path on a storage array V/O stack; and
   if the I/O request is ineligible, processing the I/O request via the first path on the host I/O stack and via the second path on the storage array I/O stack, wherein an ineligible I/O request includes a control command and satisfies a predetermined condition, wherein satisfying the predetermined condition includes a Server Device Handling layer in the host I/O stack determining, in coordination with the storage array I/O stack, that the control command should be passed to the storage array I/O stack via the second path.

7. The computer program product of claim 6 wherein an eligible I/O request includes one of a data read request and a data write request.

8. The computer program product of claim 6 wherein the operations further comprise processing the I/O request via the first path on the host I/O stack and via the second path on the storage array I/O stack when processing of the I/O request via the host I/O stack on the first path without processing the I/O request via the second path on the storage array I/O stack fails.

9. The computer program product of claim 6 wherein the operations further comprise returning a completion status to an application layer of the host I/O stack when processing of the I/O request via the host I/O stack on the first path without processing the I/O request via the second path on the storage array I/O stack successfully completes.

10. The computer program product of claim 6 wherein the internal fabric request resulting from the metadata query includes requesting at least one of a location status and a cache status of metadata within the storage array I/O stack.

11. A computing system including one or more processors and one or more memories configured to perform operations comprising:
receiving an V/O request;
identifying a first path for processing I/O requests, wherein the first path includes processing by a general purpose processor;
identifying a second path for processing I/O requests, wherein the second path includes processing by a special purpose storage processor;
identifying whether the I/O request is eligible for handling via a first path without also requiring handling via a second path;
if the I/O request is eligible, processing the I/O request via the first path on a host I/O stack without processing the I/O request via the second path on a storage array I/O stack; and
if the I/O request is ineligible, processing the I/O request via the first path on the host I/O stack and via the second path on the storage array I/O stack, wherein an ineligible I/O request includes a control command and satisfies a predetermined condition, wherein satisfying the predetermined condition includes a Server Device Handling layer in the host I/O stack determining, in coordination with the storage array I/O stack, that the control command should be passed to the storage array I/O stack via the second path.

12. The computing system of claim 11 wherein an eligible I/O request includes one of a data read request and a data write request.

13. The computing system of claim 11 wherein the operations further comprise processing the I/O request via the first path on the host I/O stack and via the second path on the storage array I/O stack when processing of the I/O request via the host I/O stack on the first path without processing the I/O request via the second path on the storage array I/O stack fails, and returning a completion status to an application layer of the host I/O stack when processing of the I/O request via the host I/O stack on the first path without processing the I/O request via the second path on the storage array I/O stack successfully completes.

14. The computing system of claim 11 wherein the internal fabric request resulting from the metadata query includes requesting at least one of a location status and a cache status of metadata within the storage array I/O stack.

* * * * *